(12) United States Patent
Marrocco et al.

(10) Patent No.: US 10,315,280 B2
(45) Date of Patent: Jun. 11, 2019

(54) INTEGRATED ROBOTIC PRESS AND REACTION FRAME

(71) Applicants: Ford Motor Company, Dearborn, MI (US); ABB Technology AG, Zurich (CH)

(72) Inventors: Alexander Marrocco, Windsor (CA); Isaac Zolotarev, Farmington Hills, MI (US); Arnold Bell, Brighton, MI (US); Joosok Jinn, Grosse Ile, MI (US); Hossein Firoozgan, Walled Lake, MI (US)

(73) Assignees: FORD MOTOR COMPANY, Dearborn, MI (US); ABB TECHNOLOGY AG, Zurich (CH)

( * ) Notice: Subject to any disclaimer, the term of this patent is extended or adjusted under 35 U.S.C. 154(b) by 180 days.

(21) Appl. No.: 15/194,992

(22) Filed: Jun. 28, 2016

(65) Prior Publication Data

US 2017/0368648 A1    Dec. 28, 2017

(51) Int. Cl.
   *B23P 19/02*    (2006.01)
   *B25J 9/16*    (2006.01)
   (Continued)

(52) U.S. Cl.
   CPC ............ *B23P 19/02* (2013.01); *B25J 9/0084* (2013.01); *B25J 9/1682* (2013.01); *B25J 9/1687* (2013.01);
   (Continued)

(58) Field of Classification Search
   CPC ..... B23P 19/02; B23P 2700/50; B25J 9/1687; Y10S 901/43; Y10S 901/31; G05B 2219/45055; G05B 2219/40032
   See application file for complete search history.

(56) References Cited

U.S. PATENT DOCUMENTS

| 3,174,322 | A | * | 3/1965 | Cookson | ................ | B21D 13/02 |
| | | | | | | 72/319 |
| 4,741,078 | A | | 5/1988 | Kimura | | |

(Continued)

FOREIGN PATENT DOCUMENTS

| CN | 202668049 U | 1/2013 |
| JP | S6224925 A | 2/1987 |

(Continued)

OTHER PUBLICATIONS

Great Britain Search Report for corresponding Application No. GB1503029.9, dated Jul. 6, 2015, 1 page.

*Primary Examiner* — John C Hong
(74) *Attorney, Agent, or Firm* — Raymond L. Coppiellie; Brooks Kushman P.C.

(57) ABSTRACT

A press frame for a robot system includes a base, a bridge and a set of columns supporting the bridge above the base. A first robot holds a part on the base and a second robot manipulates a pressing tool to press a component into an opening. The pressing tool is backed by the bridge that opposes a reaction force resulting from pressing the component part into the part. A method of assembling components to a part by pressing the part into an opening while engaging the bridge of a reaction frame. The part is transferred to the base by a first robot that positions the part on the base. A pressing tool and a component are selected by a second robot that orients the component to be inserted in the opening. Data relating to displacement, load and time is collected by the controller.

15 Claims, 6 Drawing Sheets

(51) Int. Cl.
  *B25J 9/00*   (2006.01)
  *B25J 11/00*  (2006.01)
  *B25J 13/08*  (2006.01)
  *B25J 15/00*  (2006.01)

(52) U.S. Cl.
  CPC ............. *B25J 11/00* (2013.01); *B25J 13/085* (2013.01); *B25J 15/0019* (2013.01); *B23P 2700/50* (2013.01); *G05B 2219/39129* (2013.01); *G05B 2219/40032* (2013.01); *G05B 2219/45055* (2013.01); *Y10S 901/31* (2013.01); *Y10S 901/43* (2013.01)

(56) References Cited

U.S. PATENT DOCUMENTS

| | | |
|---|---|---|
| 5,357,675 A | 10/1994 | Danmoto et al. |
| 5,761,785 A | 6/1998 | Connolly |
| 5,940,967 A | 8/1999 | Wuyts et al. |
| 6,834,428 B2 | 12/2004 | Ravert, Jr. et al. |
| 7,318,715 B2 * | 1/2008 | Markeli ............ B30B 1/28 425/135 |
| 8,079,143 B2 | 12/2011 | Zhang et al. |
| 8,607,426 B1 | 12/2013 | Goggins et al. |
| 2002/0029450 A1 * | 3/2002 | Kondo ............... B21J 15/025 29/407.01 |
| 2002/0100159 A1 | 8/2002 | Swartz et al. |
| 2013/0327104 A1 * | 12/2013 | Haselboeck ........ B21D 5/0254 72/21.3 |
| 2014/0290060 A1 | 10/2014 | Kikukawa et al. |
| 2015/0066199 A1 | 3/2015 | Shimono |
| 2016/0152102 A1 * | 6/2016 | Campbell .......... B60C 25/0515 29/894.3 |

FOREIGN PATENT DOCUMENTS

| | | |
|---|---|---|
| JP | S6322234 A | 1/1988 |
| WO | 2008087702 A1 | 7/2008 |

* cited by examiner

INTEGRATED ROBOTIC PRESS AND REACTION FRAME

TECHNICAL FIELD

This disclosure relates to robotic assembly operations for pressing components into openings defined by a part.

BACKGROUND

Assembly of parts such as cylinder heads, engine blocks, axles and transmissions originally were performed manually with the parts to be assembled being installed by workers with hand tools. Parts, such as caps, spark plug tubes, cup plugs, ball seals, dowel pins, oil restrictors, bearings seals, crush spacers, bushings, and the like, are pressed into openings that may be coated with a lubricant/sealer. Problems with manual assembly operations include inconsistent results, assembly quality defects, and excessive labor costs.

Dedicated assembly lines were developed to increase consistency and reduce labor costs. However, dedicated assembly lines lack flexibility and are limited to assembling one model of a part and cannot be used for other similar parts without substantial changeover downtime. Dedicated assembly lines make it difficult to control of the quality of pressed-in component part operations. If a part is improperly installed, omitted from an assembly, or the wrong component is installed, the part must be taken off-line for repair or scrapped. If a new part assembly line is developed, long lead times are required to build new dedicated tools. Dedicated pressing operation tools require a substantial amount of manufacturing floor space and capital investment.

Robots used in manufacturing operations have limited reaction force compensating capacity. By way of example, between 20 and 40 kilo Newtons of force may be required to be applied by the press held by the robot arm to install a component part in an opening in an assembled part in a pressing operation. Deflection of the robot arm when a pressing force is applied can result in inconsistent assembly and quality control problems.

This disclosure is directed to solving the above problems and other problems as summarized below.

SUMMARY

According to one aspect of this disclosure, an apparatus is disclosed for assembling a component to a part. A first robot includes a gripper for manipulating the part and second robot includes a pressing tool assembly. A reaction press frame includes a base and a bridge supported above the base by columns. The first robot retains the part on the base while the second robot presses the component into the part while engaging the bridge.

According to other aspects of this disclosure, a load cell is operatively connected to the pressing tool between the base, the part, and the bridge for measuring the load applied to the component when the component is assembled to the part.

A lubricant/sealer dispenser may be provided and the first robot may function to transfer the part between the base and the lubricant/sealer dispenser. The lubricant/sealer dispenser applies a lubricant/sealer to an opening defined by the part before transferring the part to the press base.

A tool magazine may be provided and the second robot may pick a pressing tool from the magazine. The second robot aligns the pressing tool and the component with an opening defined by the part.

The first robot may retain the part on the base while the second robot aligns the pressing tool assembly and the component with the part. The pressing tool assembly may press the component into an opening defined by the part with a reaction force applied to the pressing tool being opposed by the bridge. The pressing tool assembly may be oriented to engage the part on the press base with the second robot being oriented to engage the bridge.

The first robot may be adapted to transfer the part from a pallet used to transfer the part to the apparatus.

The base may include a plurality of receiving surfaces that are adapted to receive different types of parts, wherein each part type is received on a different receiving surface. The first robot and the second robot may be programmed to transfer each part type to a selected receiving surface and install components as specified for a selected part type.

The part may include a plurality of faces that receive components. The first robot moves the part on the base to orient one of the faces receiving components to face the bridge.

According to another aspect of this disclosure, a press frame and a robot system is disclosed that includes a base, a bridge and a set of columns supporting the bridge above the base. The press frame and robot system includes a first robot for holding a part on the base and also includes a second robot for manipulating a pressing tool. The pressing tool presses a component into an opening defined by the part. The pressing tool engages the bridge that opposes a reaction force resulting from pressing the component into the part.

According to another aspect of this disclosure, a method is disclosed for assembling components to a part by pressing the part into an opening defined by the part. The method comprises providing a base and a bridge supported above the base. The part is transferred to the base with a first robot that positions the part on the base. A pressing tool and a component part are selected from a tool magazine and a component tray by a second robot that orients the component to be inserted in an opening defined by the part. The component is pressed into the part with the second robot or the press tool engaging the bridge. The press tool is secured to the second robot and either may engage or contact the bridge to compensate for the press tool reaction force. For brevity, references herein to the second robot engaging the bridge should be construed to also include the press tool engaging the bridge.

According to other aspects of this disclosure, reaction forces resulting from pressing the component into the part are opposed by the bridge. The step of transferring the part to the base may include transferring the part between a lubricant/sealer application station and the base. The step of picking a pressing tool and a component may further comprise picking a second pressing tool and a second component with the second robot and orienting the second component to be inserted into a second opening defined by the part.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
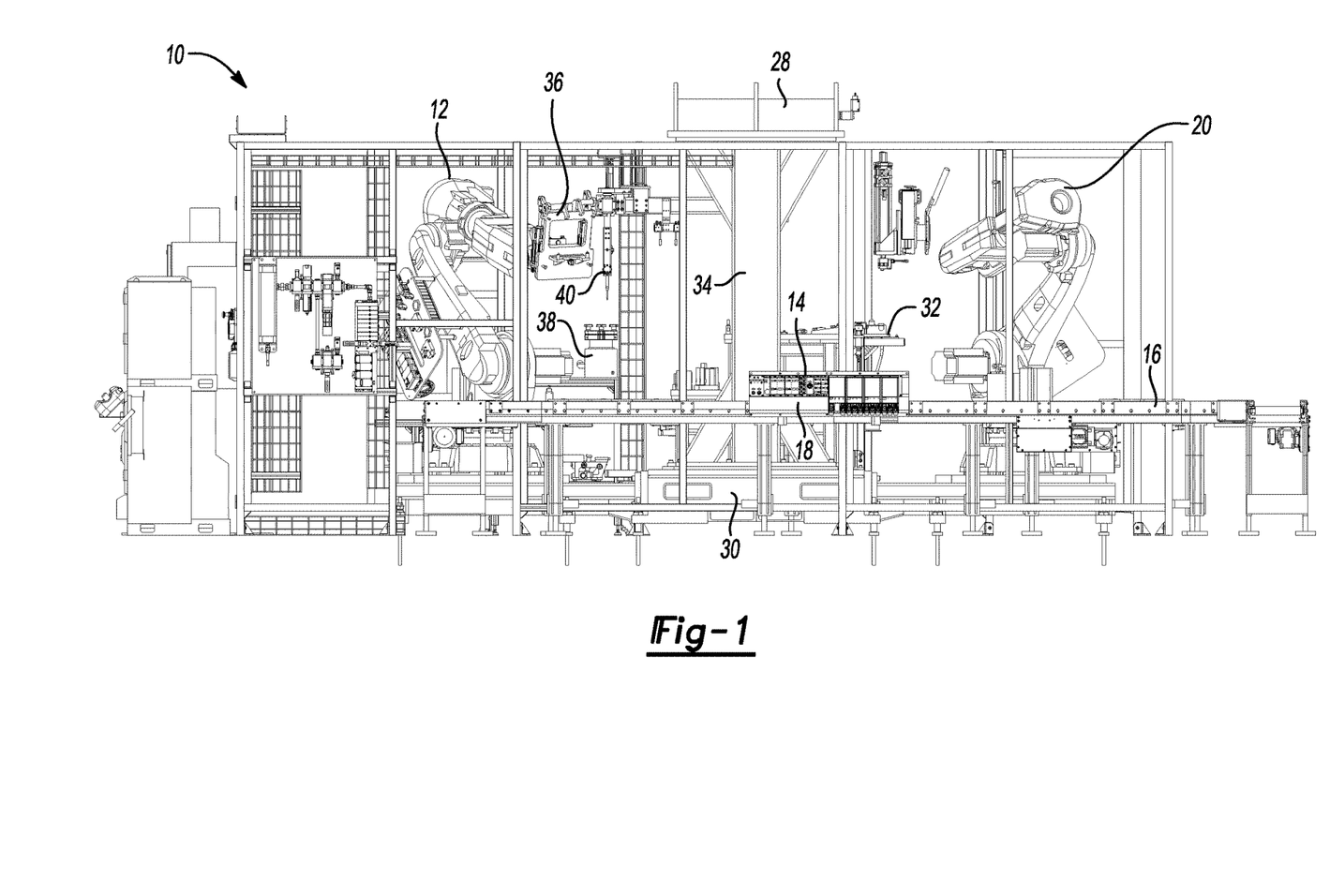
FIG. 1 is a front elevation view of a component press-in system made according to one aspect of this disclosure.
Figure 2:
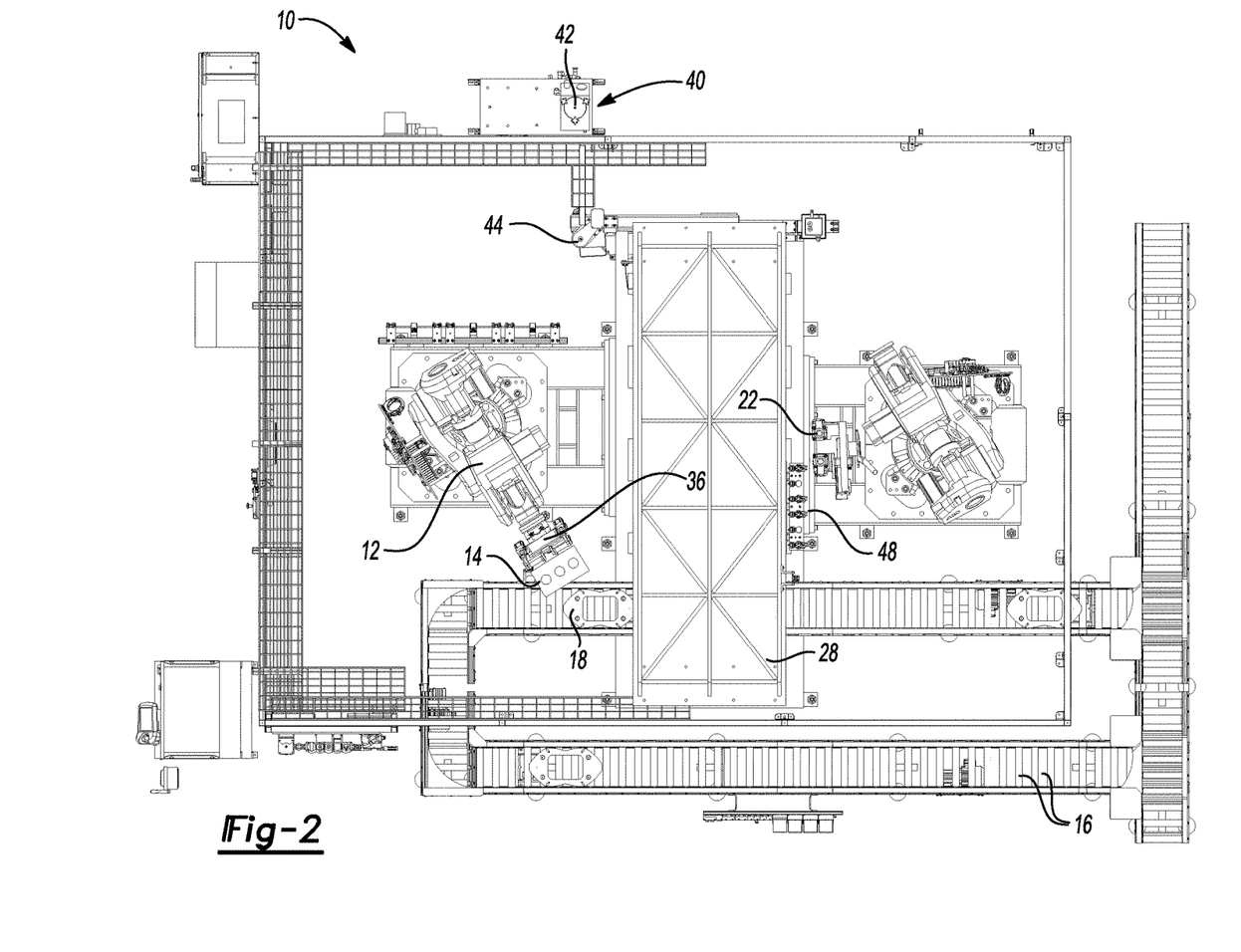
FIG. 2 is a top plan view of the component press-in system shown in FIG. 1.
Figure 3:
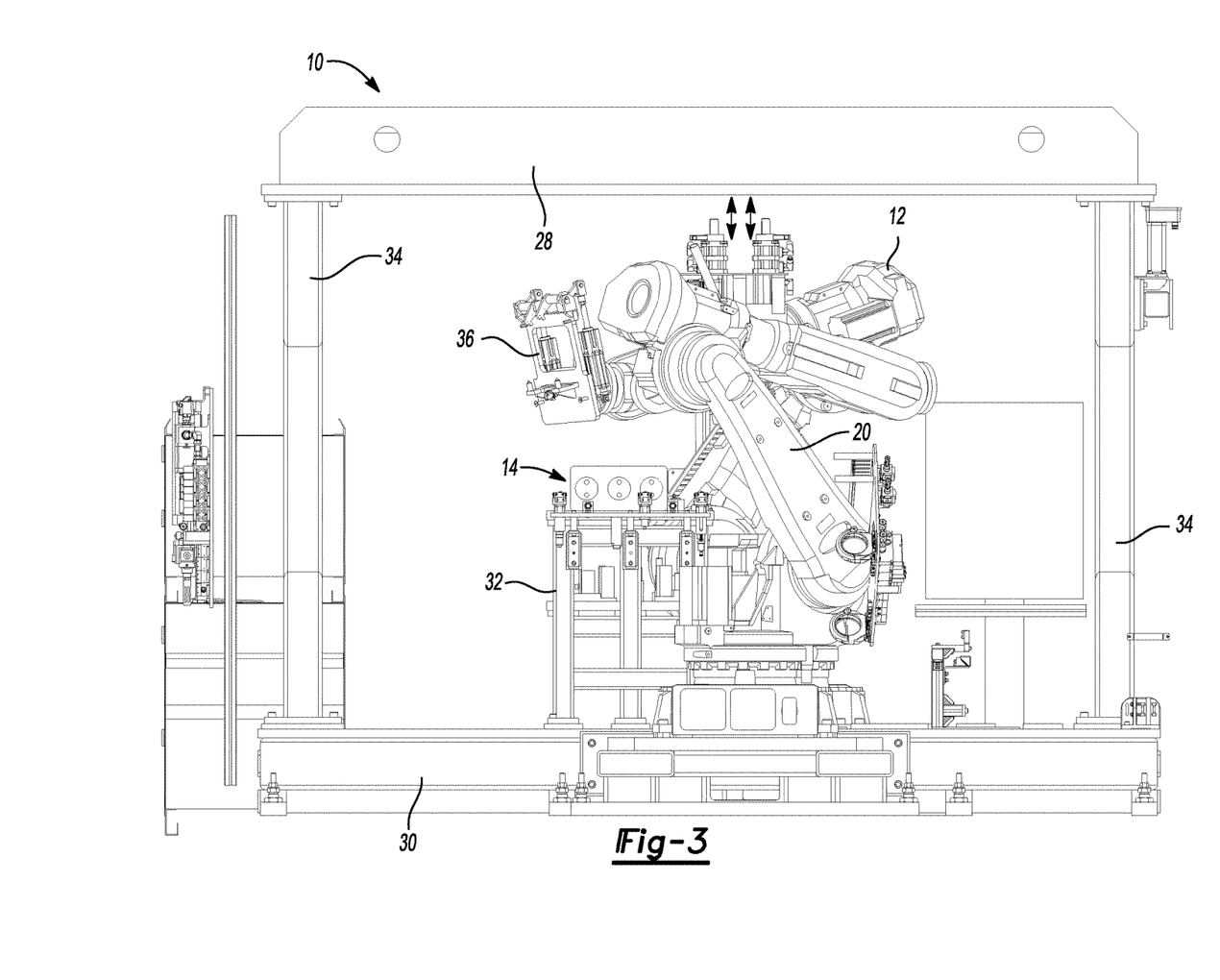
FIG. 3 is a side elevation view of the component press-in system shown in FIG. 1.

Referring to FIGS. 1 and 2, a component press-in system 10 is shown that may be used to press components such as caps, spark plug tubes, expansion cups, bearings, and the like, into parts such as cylinder-heads, engine blocks, axles, differentials and other assemblies for vehicles and other high volume cast parts. The component press-in system 10 includes a first robot 12 that manipulates a part 14, for example a cylinder head, by taking the part 14 from a conveyor 16 that supplies the parts 14 to the system 10 on a pallet 18. A second robot 20 is provided with an end effector including a pressing tool 22, shown in FIG. 3, for pressing components 24 into the part 14.

A reaction force bridge 28 is attached to a base 30 and is used to counteract the reaction force that is created when the pressing tool 22 presses a component 24 into the part 14. A press fixture table 32 supports the part 14 above the base 30 while the pressing tool 22 presses components 24 into the part 14. The bridge 28 is supported on columns 34 that are supported by the base 30. The first robot 12 includes a gripper 36 for manipulating the part 14 and second robot 20 includes a pressing tool 22.

A lubricant/sealer dispenser system 40 includes a pressurized lubricant/sealer reservoir 42 and a nozzle assembly 44.

Figure 4:
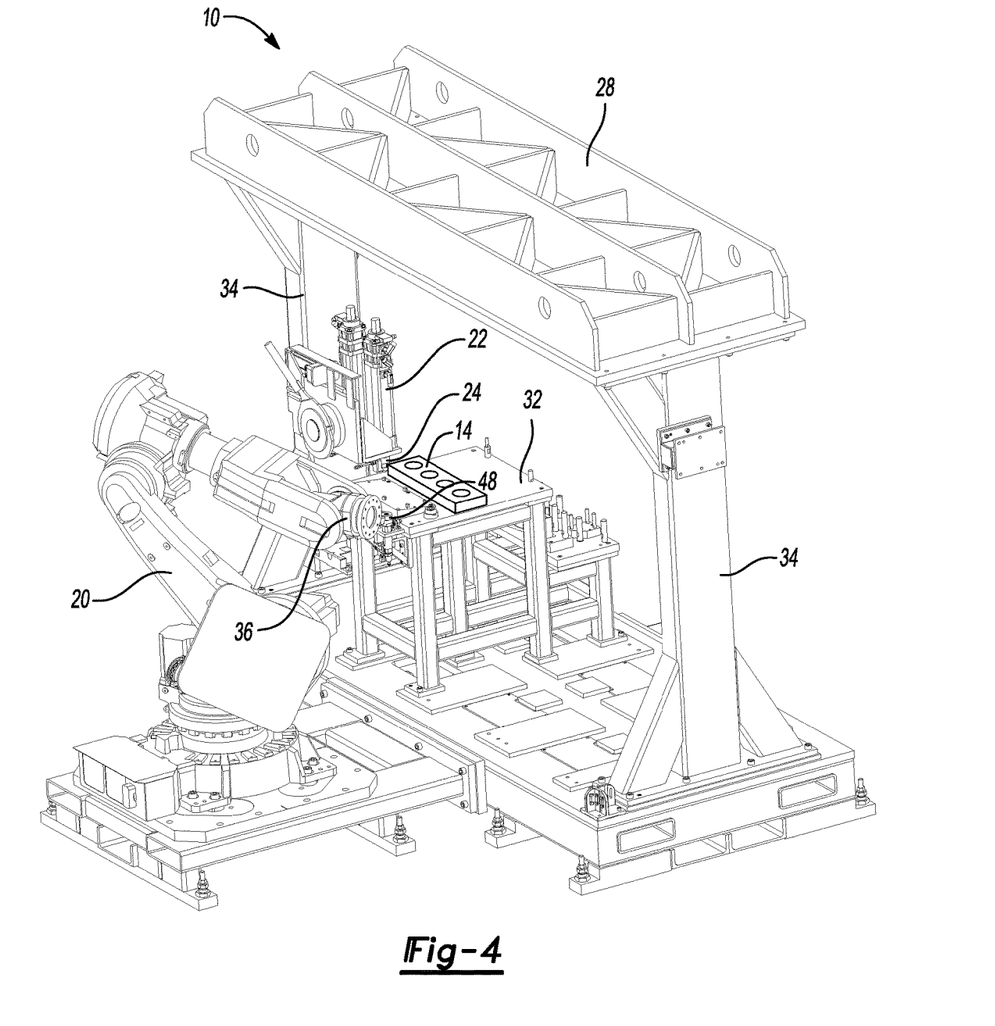
FIG. 4 is a perspective view of one robot with a press fixture table and reaction force bridge.
Figure 5:
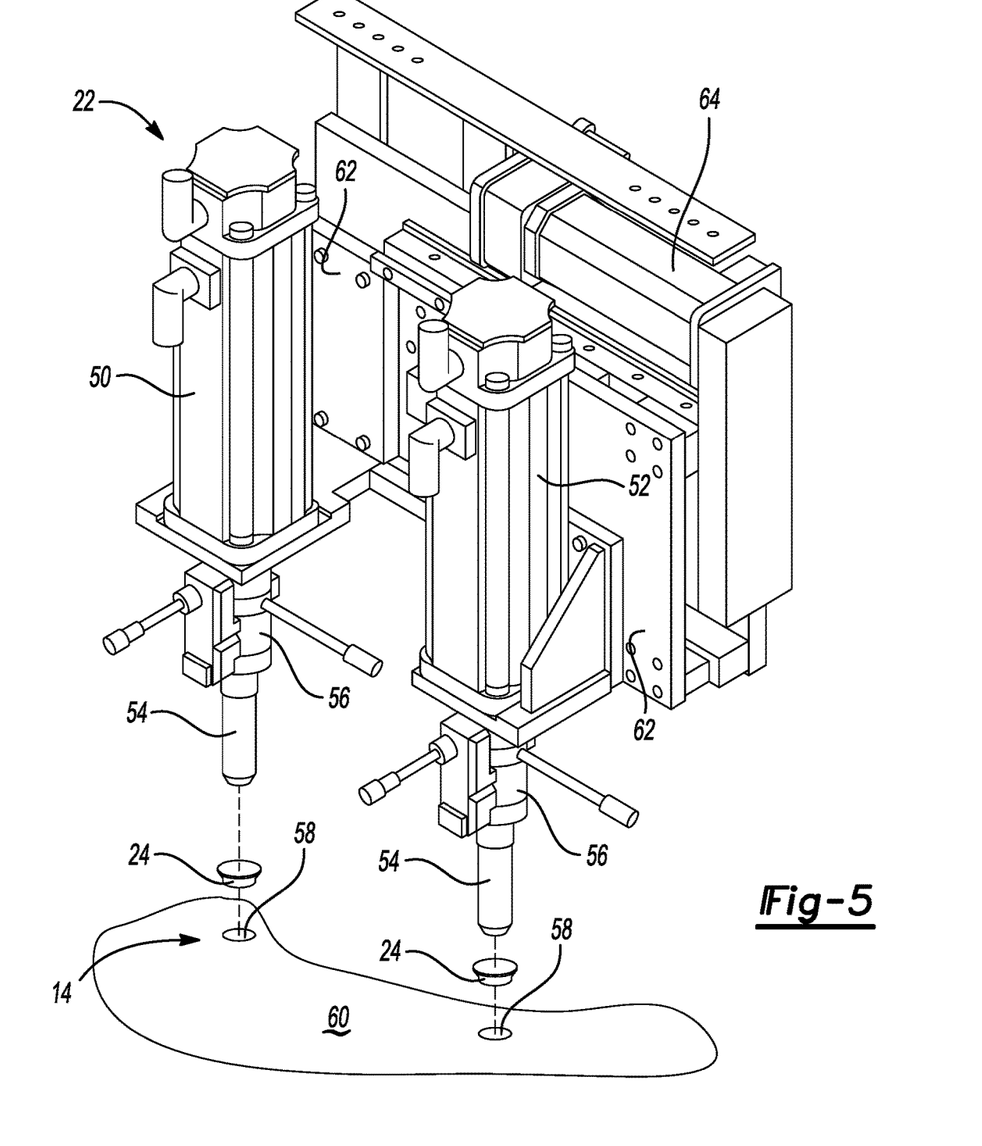
FIG. 5 is a perspective view of a pressing tool with components and a part oriented to receive the components.

As shown in FIGS. 2, 4 and 5, a tool magazine 48 is accessed by the pressing tool 22 and has a plurality of differently configured tools 54.

The pressing tool 22 includes a first servomotor press 50 and a second servomotor press 52 that are used in tandem to independently press two components 24 into an opening 58 in a part 14. The part 14 may have, for example six faces, or receiving surfaces 60. The receiving surfaces 60 are oriented on the press fixture table 32 to face the bridge 28 when the components 24 are pressed into the part 14. The first servomotor press 50 and the second servomotor press 52 are adjusted by the servomotors to the desired height and/or force. The first servomotor press 50 and the second servomotor press 52 are attached to separate mounting plates 62. The mounting plates 62 are moved together and apart by a pitch adjustment servomotor 64 to change the spacing between the presses 50 and 52. The pitch adjustment servomotor 64 moves the first and second servomotor presses to pick up tools 54 from the tooling magazine 48 and to pick up components 24 from the pallet 18 (shown in FIGS. 1 and 2). The pitch adjustment servomotor 64 adjusts the spacing to the spacing of the openings 58 in the receiving surface 60.

Figure 6:
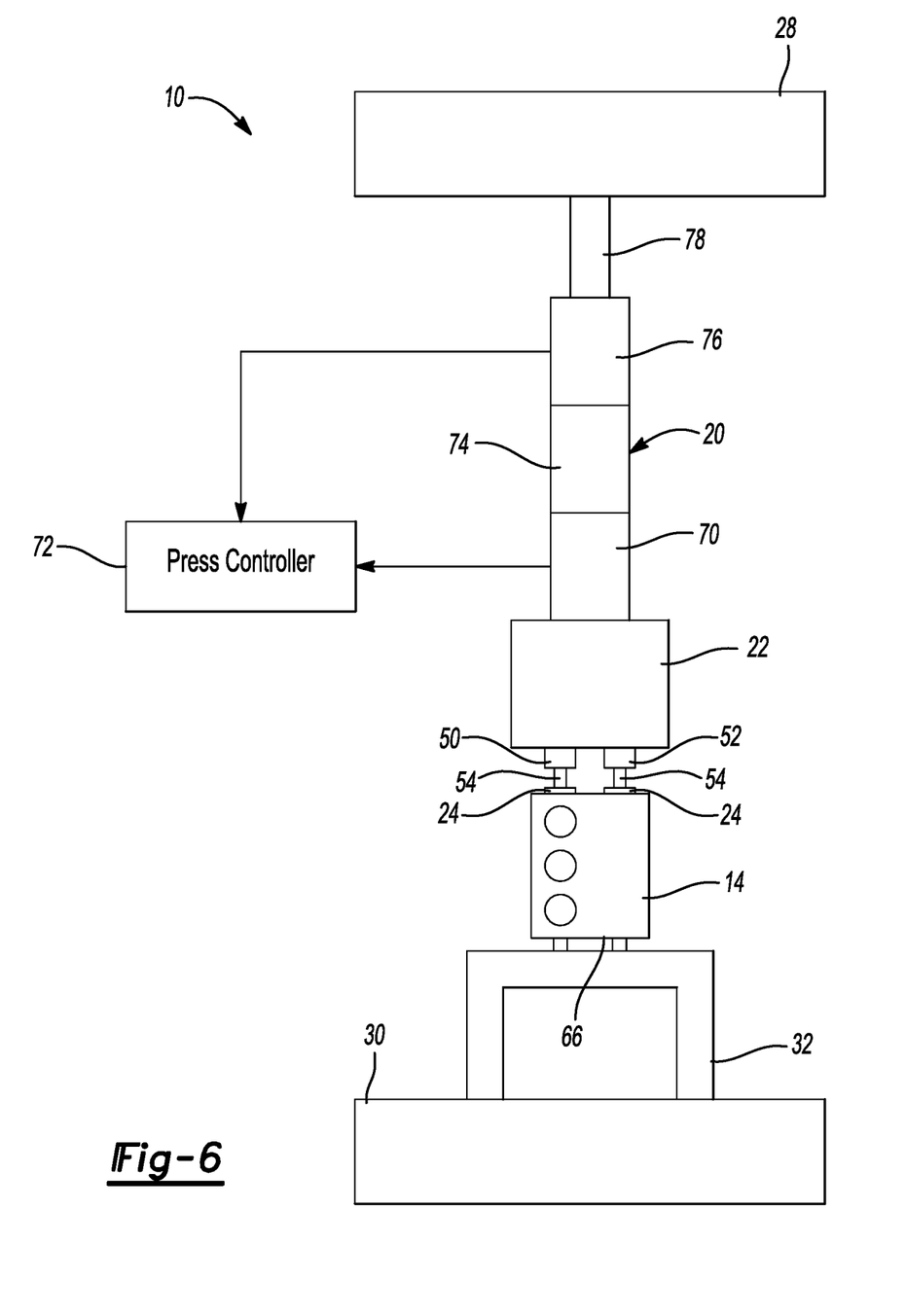
FIG. 6 is a diagrammatic view of the component press-in system.

Referring to FIG. 6, the component press-in system 10 is illustrated diagrammatically. The second robot 20 that operates the pressing tool 22 is shown in position for pressing components 24 into a part 14. The first servomotor press 50 and the second servomotor press 52 retain the tools 54. The tools 54 hold the components 24 by vacuum or by a mechanical gripping apparatus. In the example shown in FIG. 6, the part is a cylinder head but it should be understood that the part could be any of a variety of parts such as a transmission housing, an engine block, a differential, or the like.

The part 14 is placed on the press fixture table 32 by the first robot 12 (shown in FIGS. 1-3) and is positioned on locator posts 66 that are arranged to engage the part in non-critical locations to prevent damage to the parts 14. The press fixture table 32 is supported by the base 30.

The second robot 20 includes an encoder 70 that monitors the displacement of the first and second servomotor presses 50 and 52 and provides feedback relating to displacement to a press controller 72. The second robot 20 also includes resolvers 74 that may be installed above the encoder 70. The resolver 74 controls the operation of the servomotors of the robot 20. A plurality of load cells 76 may be arranged above the resolver 74 on the second robot 20. The load cells 76 provide data corresponding to the pressure exerted by the servomotor presses 50 and 52. The load cells 76 may be an internal part of the second robot 20. A post 78 is shown between the bridge 28 and the load cell 76 in FIG. 6. The above elements of the second robot 20 are preferably arranged perpendicularly relative to the bridge 28. The order of the elements may be changed and the elements may be combined.

The post 78 engages the bridge 28 during the pressing operation to provide a reaction force to the force applied to the component 24 as the component 24 is pressed into the part 14. The post 78 engages the bridge 28 to permit greater pressing force to be applied compared to a robot that is not backed up by a bridge. By engaging the bridge 28, the robot 20 is stabilized and is less subject to deflection.

Controller 72 may include or may be interfaced with a data collection system that includes data analysis software and data storage capabilities. The encoder 70 provides displacement data that can be monitored to determine if the component 24 was pressed too deep into the opening 58, if the component 24 was omitted, or if the component was not sufficiently pressed into the opening 58. The encoder 70 can also detect other conditions such as if two components 24 are installed.

The load cells 76 provide load data to the controller 72 and are interfaced with the data collection system for data analysis and storage. The load cell 76 monitors the load applied by the pressing tool 22 and can determine if insufficient or excessive load is applied. The amount of load applied may enable the press controller to determine whether there is misalignment of the component 24 relative to an opening 58 in the part or if more than one part was installed at the same time, or if the opening and/or parts are within specification. Load data may be stored to verify compliance with quality control specifications for subsequent analysis.

The controller 72 or data collection system also collects press load data in a time domain and can provide real time feedback to the robots 12 and 20. In addition, time monitored during a pressing operation can be integrated with the displacement data and the load data to provide a wide variety of information for press quality control.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An apparatus for assembling a component to a part comprising:
 a first robot that grips and manipulates the part;
 a second robot including a pressing tool; and
 a press frame including a base and a bridge supported above the base by columns, wherein the first robot retains the part on a table fixture while the second robot manipulates a pressing tool and a component to be pressed into an opening defined by the part and presses the component into the part with the bridge backing the pressing tool to oppose a pressing tool reaction force.

2. The apparatus of claim 1 further comprising:
 a load cell operatively connected to the pressing tool between the base, the part, and the bridge for measuring a load applied to the component when the component is assembled to the part.

3. The apparatus of claim 1 further comprising:
 an encoder operatively connected to the pressing tool between the base, the part, and the bridge for measuring displacement of the component as the component is assembled to the part.

4. The apparatus of claim 1 wherein the table fixture installed between the base and the pressing tool, the part being supported on the table fixture as the component is pressed into the part, wherein the pressing tool exerts a pressing force on the component, and wherein the bridge opposes the pressing reaction force.

5. The apparatus of claim 1 further comprising:
 a lubricant/sealer dispenser, wherein the first robot transfers the part between the base and the lubricant/sealer dispenser that applies a lubricant/sealer to an opening defined by the part and transfers the part to the base.

6. The apparatus of claim 1 further comprising:
 a tool magazine, wherein the second robot picks a press tool from the tool magazine and aligns the pressing tool and the component with an opening defined by the part.

7. The apparatus of claim 1 wherein the first robot retains the part on the table fixture, the second robot aligns the pressing tool and the component with the part, wherein the pressing tool presses the component into an opening defined by the part.

8. The apparatus of claim 1 wherein the first robot retains the part on the table fixture, the second robot aligns the pressing tool and the component with the part, wherein the pressing tool presses the component into an opening defined by the part, wherein the pressing tool is oriented to engage the part on the base and the second robot engages the bridge.

9. The apparatus of claim 1 wherein the first robot transfers the part from a pallet used to transfer the part to the apparatus.

10. The apparatus of claim 1 wherein the table fixture includes a plurality of receiving surfaces that are adapted to receive different types of parts, wherein each part type is received on a different receiving surface, and wherein the first robot and the second robot are programed to transfer each part type to a selected receiving surface and install components as specified for a selected part type.

11. The apparatus of claim 1 wherein the part includes a plurality of faces that receive components, wherein the first robot moves the part on the base to orient one of the faces receiving components to face the bridge.

12. A press frame and robot system comprising:
 a base;
 a bridge;
 a column supporting the bridge above the base;
 a first robot configured to hold a part on the base; and
 a second robot manipulates a pressing tool and a component part to be pressed into an opening defined by the part, the second robot holding the pressing tool in engagement with the bridge while the component part is pressed into the part.

13. The press frame and robot system of claim 12 further comprising:
 a load cell operatively connected between the pressing tool and the bridge for measuring a load applied to the component part when the component is assembled to the part.

14. The press frame and robot system of claim 12 wherein the base includes a plurality of receiving surfaces that are adapted to receive different part types, wherein each part type is received on a different receiving surface, and wherein the first robot and the second robot are programed to transfer each part type to a selected receiving surface and install components for a selected part type.

15. The press frame and robot system of claim 12 wherein the first robot is configured to move the part on the table fixture to orient one of a plurality of faces receiving components to face the bridge.

* * * * *